United States Patent Office 3,635,988
Patented Jan. 18, 1972

3,635,988
RACEMATE OF 2-(4-METHOXY-α-PIPERIDINO-BENZYL)CYCLOHEXANOL
Charles Ferdinand Huebner, Chatham, N.J., assignor to Ciba Corporation, Summit, N.J.
No Drawing. Filed Sept. 25, 1969, Ser. No. 861,143
Int. Cl. C07d 29/34
U.S. Cl. 260—293.68 A    3 Claims

ABSTRACT OF THE DISCLOSURE

The new 2-(4-methoxy-α-piperidonobenzyl)-cyclohexanol and therapeutically useful salts thereof are unique CNS-stimulants.

BACKGROUND OF THE INVENTION

Pat. No. 2,767,185 describes a method of preparing amino-alcohols of the Formula I

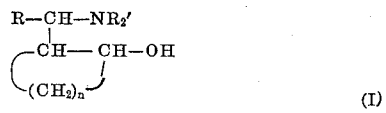
(I)

wherein $n$ is an integer from 3 to 5, R is a phenyl radical, more specifically phenyl, 3-methoxyphenyl or 2-chlorophenyl, and $NR_2'$ is methylalkylamino, methylaralkylamino, piperidino, morpholino, pyrrolidino and N'-alkylpiperazino. Various members of these amino-alcohols allegedly exhibit "useful physiological properties," none of which have been specified, however, Quaternaries of the dehydration products of the N'-alkylpiperazino compounds and their hydrogenated derivatives, i.e. the corresponding 1 - (tetra- and hexahydrobenzhydryl)-piperazinium salts, are described to be "of interest as spasmolytics."

Surprisingly, it was found that a special racemate of the compound of Formula II

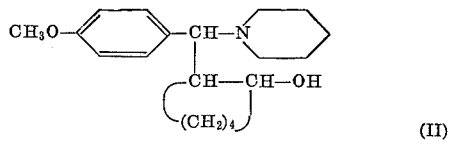
(II)

whose cyclohexylsulfamate melts at 170–173°, and other therapeutically useful salts thereof, exhibit in various animal test systems unique central nervous stimulating effects.

SUMMARY OF THE INVENTION

The present invention concerns and has for its object the provision of that new racemate of 2-(4-methoxy-α-piperidino-benzyl)-cyclohexanol (of Formula II), whose cyclohexylsulfamate melts at about 170–173°, of its optical antipodes and of therapeutically useful salts thereof, as well as of corresponding pharmaceutical compositions and of methods for the preparation and application of these products. Said compositions are useful central nervous system stimulants, for example, in the management of deficient circulation and/or respiration in mammals.

DESCRIPTION OF THE PREFERRED EMBODIMENT

Therapeutically useful salts of said new and active racemate of 2 - (4 - methoxy-α-piperidinobenzyl)-cyclohexanol are, for example, those of inorganic acids, e.g. hydrochloric, hydrobromic, sulfuric, phosphoric, nitric or perchloric acid, or of organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, amino-salicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic or cyclohexylsulfamic acid; methionine, tryptophan, lysine or arginine.

The compounds of the invention exhibit valuable pharmacological properties, for example, central nervous system stimulating effects. This can be demonstrated in animal tests, using advantageously mammals, such as mice, rats or cats, as test objects. The compounds of the invention can be administered to the animals enterally, e.g. orally, or parenterally, e.g. subcutaneously or intravenously, in the form of aqueous solutions or suspensions, which may contain methylcellulose as dispersant. The dosage may range between about 1 and 300 mg./kg./day, preferably between about 5 and 150 mg./kg./day, advantageously between about 10 and 100 mg./kg./day, whereby the enterally applied dose usually is at the higher limit and the parenterally applied dose at the lower. The stimulating effect of the compounds of the invention can be evaluated, for example, in the mice jiggle-cage or light-box test systems, for which latter also normal or adrenalectomized rats can be used. Surprisingly, it was found that the compounds of the invention only increase the spontaneous motor activity of the normal or adrenalectomized test animals, with little, if any, concomitant effect on other parameters, for example, the average sleeping time of mice i.p. injected with 100 mg./kg. of hexobarbital, the remaining time of mice on the rotorod or the patellar reflex of the chloralose urethane anesthetized cat. These effects differ substantially from those caused by amphetamine and similarly acting stimulants. Accordingly, the compounds of the invention are useful stimulants, whose major sites of action are probably the spinal cord and the neuromuscular junction. They may act through a release of catecholamines from sites other than the adrenal glands. They are also useful intermediates in the preparation of other valuable products, especially of pharmacologically active compounds.

Particularly useful is the racemic 2 - (4 - methoxy-α-piperidinobenzyl)-cyclohexanol cyclohexylsulfamate melting at about 170–173°.

The compounds of the invention are prepared according to methods known per se, e.g. those described in Pat. No. 2,767,185, i.e. by adding piperidine to 2-(4-methoxybenzylidene)-cyclohexanone, reducing the resulting 2 - (4-methoxy-α-piperidinobenzyl)-cyclohexanone and separating the resulting mixture of at most 4 different racemates with the use of cyclohexylsulfamic acid and acetone. Said reduction can be performed with the use of complex light metal hydrides, such as alkali metal boron or aluminum hydrides, e.g. lithium aluminum hydride or advantageously sodium borohydride. The resulting reduction product usually contains major amounts of but 3 racemates. It is taken up in the minimum amount of acetone, from which solution cyclohexylsulfamic acid precipitates the desired sulfamate in chromatographically pure form. It can be converted into the free amine with the use of bases, e.g. aqueous ammonia or alkali metal hydroxides, carbonates or hydrogen carbonates, and the resulting basic amine converted into other therapeutically useful acid addition salts, for example, by reacting it with the above-mentioned inorganic or organic acids or corresponding ion exchange preparations and isolating the desired salt. The racemic base can also be resolved into its optical antipodes, for example, by separation of diastereomeric salts thereof, e.g. by fractional crystallization of d- or l-tartrates.

The above reactions are carried out according to standard methods, in the presence or absence of diluents, preferably such as are inert to the reagents and are solvents thereof, of catalysts, condensing neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared accoridng to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

EXAMPLE 1

To 22.5 g. 2-(4-methoxy-benzylidene)-cyclohexanone (boiling at 151°/0.2 mm. Hg), 20 ml. piperidine are added and the mixture stirred until homogeneous. It is allowed to stand at room temperature for 6 days and evaporated in vacuo without heating. The residue is taken up in 100 ml. anhydrous ethanol and 5.6 g. sodium borohydride are added portionwise while stirring. After 2 hours, the mixture is evaporated in vacuo, the residue taken up in water and the mixture shaken with diethyl ether. The organic layer is extracted with 5% hydrochloric acid, the aqueous phase made basic with ammonia and extracted with diethyl ether. The extract is dried, filtered and evaporated, to yield a yellow viscous oil which consists of 3 major components according to thin-layer chromatography. It is taken up in the minimum amount of acetone and the solution combined with a concentrated solution of 8.9 g. cyclohexylsulfamic acid in acetone. The precipitate formed is filtered off and washed with acetone, to yield the d,l-2-(4-methoxy-α-piperidinobenzyl) - cyclohexanol cyclohexylsulfamate of the formula

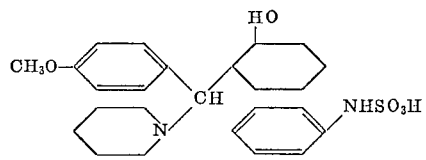

melting at 170–173°.

EXAMPLE 2

0.5 g. of 2-(4-methoxy-α-piperidinobenzyl)-cyclohexanol cyclohexylsulfamate are suspended in 5 ml. water and the mixture made strongly basic with concentrated ammonium hydroxide. It is extracted with diethyl ether, the extract dried, filtered and evaporated in vacuo, to yield the liquid d,l-2-(4-methoxy-α-piperidinobenzyl)-cyclohexanol, which has an Rf value of 10.0 on silical gel, using hexane-diethylamine (9:1) as the mobile phase.

EXAMPLE 3

Preparation of 10,000 tablets each containing 10 mg. of the active ingredient:

| Formula: | G. |
|---|---|
| 2 - (4 - methoxy-α-piperidinobenzyl)-cyclohexanol cyclohexylsulfamate | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water q.s. | |

Procedure

All the powders are passed through a screen with openings of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml. water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

I claim:
1. The racemate of 2-(4-methoxy-α-piperidinobenzyl)-cyclohexanol whose cyclohexylsulfamate melts at about 170–173°, it soptical antipodes or therapeutically useful salts thereof.
2. A compound as claimed in claim 1 and being the monoracemic d,l - 2 - (4-methoxy-α-piperidinobenzyl)-cyclohexanol or therapeutically useful salts thereof.
3. A compound as claimed in claim 1 and being the d,l-2-(4-methoxy-α-piperidinobenzyl-cyclohexanol cyclohexylsulfamate.

References Cited

UNITED STATES PATENTS

| 2,075,359 | 3/1937 | Aalzberg et al. | 424—250 |
| 2,767,185 | 10/1956 | Baltzly et al. | 260—294.7 |

HENRY R. JILES, Primary Examiner

S. D. WINTERS, Assistant Examiner

U.S. Cl. X.R.

260—590, 294.7 J, 293.83; 424—267